US012431721B2

(12) United States Patent
Kim et al.

(10) Patent No.: US 12,431,721 B2
(45) Date of Patent: Sep. 30, 2025

(54) CIRCUIT DEVICE FOR PROTECTING BATTERY

(71) Applicant: SAMSUNG SDI CO., LTD., Yongin-si (KR)

(72) Inventors: Haneul Kim, Yongin-si (KR); Kyongpil Jin, Yongin-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 560 days.

(21) Appl. No.: 17/953,716

(22) Filed: Sep. 27, 2022

(65) Prior Publication Data

US 2023/0115730 A1    Apr. 13, 2023

(30) Foreign Application Priority Data

Oct. 13, 2021    (KR) .................. 10-2021-0135932

(51) Int. Cl.
*H02J 7/00* (2006.01)

(52) U.S. Cl.
CPC ........ *H02J 7/0029* (2013.01); *H02J 7/00712* (2020.01)

(58) Field of Classification Search
CPC .. H02J 7/0029; H02J 7/00712; H02J 7/00308; H02J 7/0031; H02J 7/0047; Y02E 60/10; G01R 19/16542; G01R 31/3835

(Continued)

(56) References Cited

U.S. PATENT DOCUMENTS 3,967,138 A * 6/1976 Mitsuoka ............... H03K 17/73
                                                      327/465
6,617,906 B1 * 9/2003 Hastings ............. H03K 17/102
                                                      327/309

(Continued)

FOREIGN PATENT DOCUMENTS

CN    206060301 U       3/2017
CN    108879618 A  * 11/2018  ............... H02H 7/18

(Continued)

OTHER PUBLICATIONS

Korean Office Action dated Jul. 25, 2023, of the KR Patent Application No. 10-2021-0135932.
European Search Report issued Mar. 10, 2023.

*Primary Examiner* — M Baye Diao
(74) *Attorney, Agent, or Firm* — Lee IP Law, P.C.

(57) ABSTRACT

A battery protection circuit device includes a first voltage distribution circuit that connects to positive and negative charger terminals, and configured to distribute a charging voltage of the charger; a first FET that connects between a battery and the positive terminal to receive a charging current from the charger and supply the charging current to the battery, the first FET being connected to a first node of the first voltage distribution circuit, and controlled based on a magnitude of the charging voltage; a second voltage distribution circuit that connects to the positive and negative terminals, and configured to distribute the charging voltage; and a second FET that electrically connects to the positive terminal of the charger, the second FET being electrically connected to the first node of the first voltage distribution circuit and a second node of the second voltage distribution circuit, and turned on or off based on the magnitude of the charging voltage of the charger.

12 Claims, 6 Drawing Sheets

(58) Field of Classification Search
USPC .......................................................... 320/162
See application file for complete search history.

(56) References Cited

U.S. PATENT DOCUMENTS

| | | | | |
|---|---|---|---|---|
| 8,179,096 | B2* | 5/2012 | Bernard | H02J 7/04 |
| | | | | 320/136 |
| 10,122,191 | B2* | 11/2018 | Jin | H02J 7/00 |
| 10,218,198 | B2* | 2/2019 | Lee | A47L 9/2842 |
| 10,224,709 | B2* | 3/2019 | Jin | H02H 7/18 |
| 11,183,494 | B2* | 11/2021 | Kohama | H10D 89/911 |
| 11,817,728 | B2* | 11/2023 | Jeong | H02J 7/0036 |
| 12,057,721 | B2* | 8/2024 | Jeong | G01R 15/04 |
| 2005/0225916 | A1* | 10/2005 | Bolorforosh | B06B 1/0292 |
| | | | | 361/91.1 |
| 2008/0303487 | A1 | 12/2008 | Bernard et al. | |
| 2015/0015187 | A1 | 1/2015 | Xiang | |

FOREIGN PATENT DOCUMENTS

| | | |
|---|---|---|
| KR | 10-2007-0054192 A | 5/2007 |
| KR | 10-2017-0006963 A | 1/2017 |
| KR | 10-2021-0007237 A | 1/2017 |
| KR | 10-2018-0135674 A | 12/2018 |
| KR | 10-2020-0017779 A | 2/2020 |

* cited by examiner

FIG. 3

| CHARGING VOLTAGE | FIRST FET | SECOND FET |
|---|---|---|
| LESS THAN 19 V | OFF | OFF |
| 19V~30V | ON | OFF |
| EXCEEDING 30 V | OFF | ON |

CIRCUIT DEVICE FOR PROTECTING BATTERY

CROSS-REFERENCE TO RELATED APPLICATION

This application is based on and claims priority under 35 U.S.C. § 119 to Korean Patent Application No. 10-2021-0135932, filed on Oct. 13, 2021, in the Korean Intellectual Property Office, the disclosure of which is incorporated by reference herein in its entirety.

BACKGROUND

1. Field

Embodiments relate to a battery protection circuit device.

2. Description of the Related Art

Recently, research on and development of secondary batteries have been actively performed. Secondary batteries are chargeable/dischargeable batteries, and may include Ni/Cd batteries, Ni/MH batteries, and the like, and recent lithium ion batteries. Among secondary batteries, lithium ion batteries may have high energy density compared with Ni/Cd batteries, Ni/MH batteries, and the like. Furthermore, lithium ion batteries may be manufactured to be small and light, may be used as power sources for mobile devices. The lithium ion batteries have attracted attention as a next-generation energy storage medium due to their extended use range as power sources for electric vehicles.

SUMMARY

An embodiment is directed to a battery protection circuit device, including: a first voltage distribution circuit having one end that electrically connects to a positive terminal of a charger, and having another end that electrically connects to a negative terminal of the charger, the first voltage distribution circuit being configured to distribute a charging voltage of the charger; a first FET that electrically connects between a battery and the positive terminal of the charger to receive a charging current from the charger and supply the charging current to the battery, the first FET being electrically connected to a first node of the first voltage distribution circuit, and turned on or off based on a magnitude of the charging voltage of the charger; a second voltage distribution circuit having one end that electrically connects to the positive terminal of the charger, and having another end that electrically connects to the negative terminal of the charger, the second voltage distribution circuit being configured to distribute the charging voltage of the charger; and a second FET that electrically connects to the positive terminal of the charger, the second FET being electrically connected to the first node of the first voltage distribution circuit and a second node of the second voltage distribution circuit, and turned on or off based on the magnitude of the charging voltage of the charger.

The first node may be electrically connected to a gate terminal of the first FET, the battery electrically may connect to a drain terminal of the first FET, and the positive terminal of the charger may electrically connect to a source terminal of the first FET.

The second node may be electrically connected to a gate terminal of the second FET, the first node may be electrically connected to a drain terminal of the second FET, and the positive terminal of the charger may electrically connect to a source terminal of the second FET.

When a voltage having a second threshold value or greater is applied between the positive terminal of the charger and the second node, the second FET may be turned on to apply the charging voltage of the charger to the first node.

When the second FET is turned on and the charging voltage of the charger is applied to the first node, the first FET may be turned off.

When a voltage having a first threshold value or greater is applied between the positive terminal of the charger and the first node, the first FET may be turned on to apply the charging voltage of the charger to the battery.

A magnitude of the first threshold value may be less than a magnitude of the second threshold value.

The first voltage distribution circuit may include: a first voltage distribution resistor between the positive terminal of the charger and the first node, and a second voltage distribution resistor and a first diode between the first node and the negative terminal of the charger.

The second voltage distribution circuit may include: a third voltage distribution resistor between the positive terminal of the charger and the second node, and a fourth voltage distribution resistor and a second diode between the second node and the negative terminal of the charger.

Each of the first diode and the second diode may be a Zener diode connected in a reverse direction between the positive terminal and the negative terminal of the charger.

A magnitude of a voltage applied to the first diode may be less than a magnitude of a voltage applied to the second diode.

An embodiment is directed to a circuit, including: a first voltage distribution circuit having a first electrical connection to receive a positive voltage of a charger, and having a second electrical connection to receive a negative voltage of the charger; a second voltage distribution circuit having a first electrical connection to receive the positive voltage of the charger, and having a second electrical connection to receive the negative voltage of the charger; a first FET having a first electrical connection to receive the positive voltage of the charger, and having a second electrical connection to provide a voltage to a positive terminal of a battery; and a second FET having a first electrical connection to receive the positive voltage of the charger, and having a second electrical connection to a voltage distribution node of the first voltage distribution circuit. The first FET may have a gate terminal that is electrically connected to the voltage distribution node of the first voltage distribution circuit, and the second FET may have a gate terminal that is electrically connected to a voltage distribution node of the second voltage distribution circuit.

BRIEF DESCRIPTION OF THE DRAWINGS

Features will become apparent to those of skill in the art by describing in detail example embodiments with reference to the attached drawings in which:

FIG. 3 is a diagram for explaining an operation of a battery protection circuit device according to an example embodiment.

DETAILED DESCRIPTION

Figure 1:
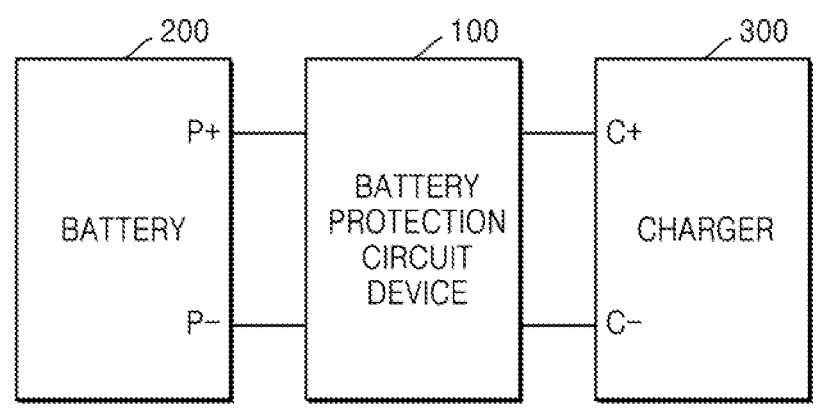
FIG. 1 is a schematic diagram showing a configuration for connecting a battery protection circuit device according to an example embodiment to a battery and a charger.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Herein, it will be understood that although the terms "first," "second," etc. may be used herein to describe various components, these components should not be limited by these terms. These terms are only used to distinguish one component from another. The expression of singularity in the specification includes the expression of plurality unless clearly specified otherwise in context. Furthermore, it will be further understood that the terms "comprises" and/or "comprising" used herein specify the presence of stated features or components, but do not preclude the presence or addition of one or more other features or components.

Herein, it will be understood that when a layer, region, or component is referred to as being "formed on" another layer, region, or component, it can be directly or indirectly formed on the other layer, region, or component. That is, for example, intervening layers, regions, or components may be present. It will be understood that when a layer, region, or component is referred to as being "connected to" another layer, region, or component, it can be directly connected to the other layer, region, or component or indirectly connected to the other layer, region, or component via intervening layers, regions, or components.

Figure 2:
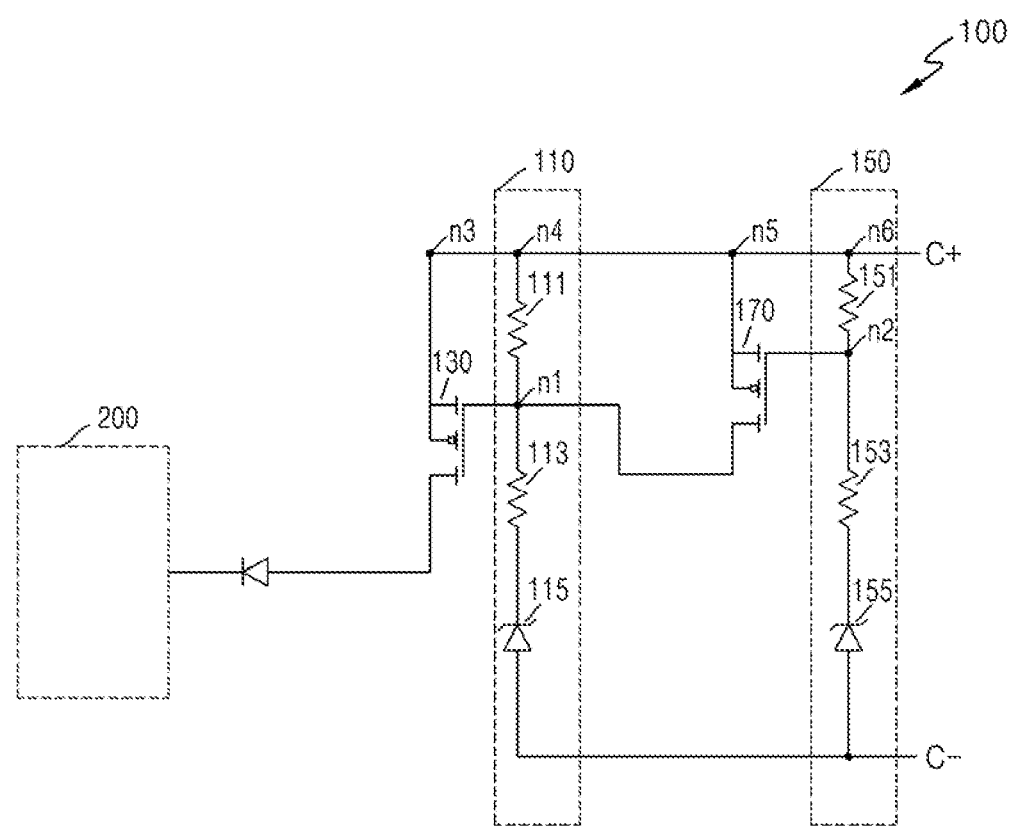
FIG. 2 is a schematic circuit diagram of a battery protection circuit device according to an example embodiment.

FIG. 1 is a schematic diagram showing a configuration for connecting a battery protection circuit device 100 according to an example embodiment to a battery 200 and a charger 300. FIG. 2 is a schematic circuit diagram of the battery protection circuit device 100 according to an example embodiment.

Referring to FIG. 1, the battery protection circuit device 100 according to an example embodiment may be electrically connected between the charger 300 and the battery 200.

The battery protection circuit device 100 may be electrically connected to a positive terminal C+ and a negative terminal C− of the charger 300. The battery protection circuit device 100 may be electrically connected to the charger 300 so that a charging current of the charger 300 may flow from the charger 300 to the battery protection circuit device 100.

The battery protection circuit device 100 may be electrically connected to a positive terminal P+ and a negative terminal P− of the battery 200. The battery protection circuit device 100 may be electrically connected to the battery 200 so that the charging current of the charger 300 may flow from the charger 300 to the battery 200.

The battery 200 may include one or more secondary batteries connected in series and/or in parallel. The battery 200 may include a battery management system (BMS).

Referring to FIG. 2, the battery protection circuit device 100 according to an example embodiment may include a first voltage distribution circuit 110, a first field effect transistor (FET) 130, a second voltage distribution circuit 150, and a second FET 170.

The battery protection circuit device 100 may further include other constituent elements relative to the drawing and some constituent elements may be omitted therefrom, e.g., for ease of description. In the battery protection circuit device 100, some constituent elements may be separated into a plurality of devices, or a plurality of constituent elements may be incorporated into one device.

One end of the first voltage distribution circuit 110 may be electrically connected to the positive terminal C+ of the charger 300 and the other end of the first voltage distribution circuit 110 may be electrically connected to the negative terminal C− of the charger 300. The first voltage distribution circuit 110 may distribute the charging voltage of the charger 300.

Referring to FIG. 2, the first voltage distribution circuit 110 may include a first voltage distribution resistor 111, a second voltage distribution resistor 113, and a first diode 115. One end of the first voltage distribution resistor 111 of the first voltage distribution circuit 110 may be electrically and directly connected to the positive terminal C+ of the charger 300, and one end of the first diode 115 of the first voltage distribution circuit 110 may be electrically and directly connected to the negative terminal C− of the charger 300. The first voltage distribution resistor 111, the second voltage distribution resistor 113, and the first diode 115 of the first voltage distribution circuit 110 may distribute the charging voltage between the positive terminal C+ and the negative terminal C− of the charger 300.

The first voltage distribution circuit 110 may include the first voltage distribution resistor 111 between the positive terminal C+ of the charger 300 and a first node n1. Referring to FIG. 2, the first voltage distribution resistor 111 may be provided between the first node n1 and a fourth node n4 of the first voltage distribution circuit 110. The first voltage distribution circuit 110 may include the second voltage distribution resistor 113 and the first diode 115 between the first node n1 and the negative terminal C− of the charger 300.

The first diode 115 may be a Zener diode that is connected in a reverse direction between the positive terminal C+ and the negative terminal C− of the charger 300.

Referring to the equations below, the charging voltage between the positive terminal C+ and the negative terminal C− of the charger 300 may be the same as the sum of the voltages respectively applied to the first voltage distribution resistor 111, the second voltage distribution resistor 113, and the first diode 115.

$$Vcc = Vr1 + Vr2 + Vz1 \qquad <\text{Equation 1}>$$

$$Vr1 = (Vcc - Vz1) \times \frac{r1}{r1+r2} \qquad <\text{Equation 2}>$$

In the above equations:
Vcc is a value of the charging voltage of the charger 300,
Vr1 is a value of the voltage applied to the first voltage distribution resistor 111, Vr2 is a value of a voltage applied to the second voltage distribution resistor 113, Vz1 is a value of a breakdown voltage of the first diode 115, r1 is a resistance value of the first voltage distribution resistor 111, and r2 is a resistance value of the second voltage distribution resistor 113.

The second voltage distribution circuit 150 may be provided between the first voltage distribution circuit 110 and the charger 300. One end of the second voltage distribution circuit 150 may be electrically connected to the positive terminal C+ of the charger 300, and the other end thereof may be electrically connected to the negative terminal C− of the charger 300. The second voltage distribution circuit 150 may distribute a charging voltage of the charger 300.

Referring to FIG. 2, the second voltage distribution circuit 150 may include a third voltage distribution resistor 151, a fourth voltage distribution resistor 153, and a second diode 155. One end of the third voltage distribution resistor 151 of the second voltage distribution circuit 150 may be electrically and directly connected to the positive terminal C+ of the charger 300, and one end of the second diode 155 of the second voltage distribution circuit 150 may be electrically and directly connected to the negative terminal C− of the charger 300. The third voltage distribution resistor 151, the fourth voltage distribution resistor 153, and the second diode 155 of the second voltage distribution circuit 150 may distribute the charging voltage between the positive terminal C+ and the negative terminal C− of the charger 300.

The second voltage distribution circuit 150 may include the third voltage distribution resistor 151 between the positive terminal C+ of the charger 300 and a second node n2. Referring to FIG. 2, the third voltage distribution resistor 151 may be provided between the second node n2 and a sixth node n6 of the second voltage distribution circuit 150. The second voltage distribution circuit 150 may include the fourth voltage distribution resistor 153 and the second diode 155 between the second node n2 and the negative terminal C− of the charger 300.

The second diode 155 may be a Zener diode connected in a reverse direction between the positive terminal C+ and the negative terminal C− of the charger 300.

Referring to equations below, the charging voltage between the positive terminal C+ and the negative terminal C− of the charger 300 may be the same as the sum of the voltages respectively applied to the third voltage distribution resistor 151, the fourth voltage distribution resistor 153, and the second diode 155.

$$Vcc = Vr3 + Vr4 + Vz2 \qquad < \text{Equation 3} >$$

$$Vr3 = (Vcc - Vz2) \times \frac{r3}{r3 + r4} \qquad < \text{Equation 4} >$$

In the above equations,

Vcc is a value of the charging voltage of the charger 300,

Vr3 is a value of the voltage applied to the third voltage distribution resistor 151, Vr4 is a value of the voltage applied to the fourth voltage distribution resistor 153.

Vz2 is a value of a breakdown voltage of the second diode 155, r3 is a resistance value of the third voltage distribution resistor 151, and r4 is a resistance value of the fourth voltage distribution resistor 153.

The first FET 130 may be electrically connected between the battery 200 and the positive terminal C+ of the charger 300. The first FET 130 may receive the charging current from the charger 300 and supply the charging current to the battery 200. The first FET 130 may be electrically connected to the first node n1 of the first voltage distribution circuit 110. The first FET 130 may be turned on or turned off based on the magnitude of the charging voltage of the charger 300. Referring to FIG. 2, the first FET 130 may be electrically and directly connected between the battery 200, the first node n1, and a third node n3. When the first FET 130 is turned on, the charging current may be supplied from the charger 300 to the battery 200.

Referring to FIG. 2, in the first FET 130, the first node n1 and the gate terminal of the first FET 130 may be electrically connected to each other. The battery 200 and the drain terminal of the first FET 130 may be electrically connected to each other. The positive terminal C+ of the charger 300 and the source terminal of the first FET 130 may be electrically connected to each other.

The second FET 170 may be electrically connected to the first node n1, the positive terminal C+ of the charger 300, and the second node n2 of the second voltage distribution circuit 150. Referring to FIG. 2, the second node n2 and the gate terminal of the second FET 170 may be electrically connected to each other. The first node n1 and the drain terminal of the second FET 170 may be electrically connected to each other. The positive terminal C+ of the charger 300 and the source terminal of the second FET 170 may be electrically connected to each other. The drain terminal of the second FET 170 may be electrically and directly connected to the gate terminal of the first FET 130.

The first FET 130 and the second FET 170 may each be a metal oxide semiconductor FET (MOSFET). The first FET 130 and the second FET 170 may be selectively turned on or off so as to control conduction of the charging current. The first FET 130 and the second FET 170, as FET devices each including gate, drain, and source terminals, may be turned on or turned off depending on whether a channel is formed according to the voltage applied between the gate terminal and the source terminal. In the example embodiment of FIG. 2, each of the first FET 130 and the second FET 170 are implemented as an N-type MOSFET, but the MOSFET is not limited to the N-type MOSFET.

The first FET 130 may be turned on or turned off based on the magnitude of the charging voltage of the charger 300. The second FET 170 may be turned on or turned off based on the magnitude of the charging voltage of the charger 300. For example, the first FET 130 may be turned on when a voltage of a first threshold value or greater is applied between the gate terminal and the source terminal of the first FET 130, and the second FET 170 may be turned on when a voltage of a second threshold value or greater is applied between the gate terminal and the source terminal of the second FET 170. The first threshold value may be a threshold voltage at which the first FET 130 is turned on, and the second threshold value may be a threshold voltage at which the second FET 170 is turned on.

According to an example embodiment of the battery protection circuit device 100, the magnitude of the first threshold value may be less than the magnitude of the second threshold value. In this case, the first FET 130 and the second FET 170 may be turned on at different threshold voltages from each other. For example, the first FET 130 may have a different threshold voltage than the second FET 170.

In another example embodiment, the magnitude of the first threshold value may be the same as the magnitude of the second threshold value. In this case, the first FET 130 and the second FET 170 may be turned on at the same threshold voltage.

The first FET 130 according to an example embodiment may be turned on when a voltage of a preset, e.g., predetermined, first threshold value or greater is applied between the positive terminal C+ of the charger 300 and the first node n1, so that the charging voltage of the charger 300 is applied to the battery 200. For example, in the example embodiment shown in FIG. 2, the first FET 130 may be turned on when a voltage of a preset first threshold value or greater is applied to the first voltage distribution resistor 111, so that the charging voltage of the charger 300 is applied to the battery 200.

For example, the first FET 130 may be turned on when the magnitude of a voltage applied to the first voltage distribution resistor 111 is greater than the magnitude of the threshold voltage of the first FET 130 as in Equation 5 below, $$Vth1 < Vr1 \qquad \text{<Equation 5>}$$

wherein Vth1 is a value of the threshold voltage of the first FET 130, and Vr1 is a value of the voltage applied to the first voltage distribution resistor 111.

The second FET 170 may be turned on when a voltage of a preset second threshold value or greater is applied between the positive terminal C+ of the charger 300 and the second node n2, so that the charging voltage of the charger 300 is applied to the first node n1. For example, in the example embodiment shown in FIG. 2, the second FET 170 may be turned on when a voltage of a preset second threshold value or greater is applied to the third voltage distribution resistor 151, so that the charging voltage of the charger 300 is applied to the gate terminal of the first FET 130.

For example, the second FET 170 may be turned on when the magnitude of the voltage applied to the third voltage distribution resistor 151 is greater than the magnitude of the threshold voltage of the second FET 170, as in Equation 6 below, $$Vth2 < Vr3 \qquad \text{<Equation 6>}$$

wherein Vth2 is a value of the threshold voltage of the second FET 170, and Vr3 is a value of the voltage applied to the third voltage distribution resistor 151.

The first FET 130 may be turned off when the second FET 170 is turned on, so that the charging voltage of the charger 300 is applied to the first node n1. For example, in the example embodiment shown in FIG. 2, when the second FET 170 is turned on so that the charging voltage of the charger 300 is applied to the first node n1, the charging voltage of the charger 300 may be applied to the gate terminal of the first FET 130. In this case, as there is no potential difference between the gate terminal of the first FET 130 and the source terminal of the first FET 130, the first FET 130 may be turned off.

In some example embodiments, the battery protection circuit device 100 may include more constituent elements than the constituent elements shown in FIG. 2. For example, the battery protection circuit device 100 may further include a processor and a memory. The battery protection circuit device 100 may further include other constituent elements, such as a battery supplying power to internal constituent elements, various sensors, databases, and the like.

FIG. 3 is a diagram for explaining an operation of a battery protection circuit device according to an example embodiment.

Referring to FIGS. 2 and 3 together, the magnitude of the voltage applied to the first diode 115 may be less than the magnitude of the voltage applied to the second diode 155. For example, in the example embodiment shown in FIG. 2, the threshold voltage of the first FET 130 and the threshold voltage of the second FET 170 may have the same magnitude, and the first voltage distribution resistor 111, the second voltage distribution resistor 113, the third voltage distribution resistor 151, and the fourth voltage distribution resistor 153 may have the same resistance value. In this case, the battery protection circuit device 100 according to an example embodiment is designed such that the magnitude of the voltage applied to the first diode 115 is less than the magnitude of the voltage applied to the second diode 155 so that a charging voltage in a preset voltage range is applied to the battery 200. For example, as shown in the table of FIG. 3, a preset charging voltage range may be set between 19 V and 30 V.

In the battery protection circuit device 100 according to an example embodiment, when the charging voltage of the charger 300 is less than 19 V, both of the first FET 130 and the second FET 170 may be turned off. For example, when the charging voltage of the charger 300 is less than 19 V, the magnitude of the voltage applied to each of the first voltage distribution resistor 111 and the third voltage distribution resistor 151 is less than the magnitude of the threshold voltage of each of the first FET 130 and the second FET 170.

Furthermore, in the battery protection circuit device 100 according to an example embodiment, when the charging voltage of the charger 300 is from 19 V to 30 V, the first FET 130 may be turned on and the second FET 170 may be turned off. For example, when the charging voltage of the charger 300 is from 19 V to 30 V, the magnitude of the voltage applied to the first voltage distribution resistor 111 is greater than the magnitude of the threshold voltage of the first FET 130, and the magnitude of the voltage applied to the third voltage distribution resistor 151 is less than the magnitude of the threshold voltage of the second FET 170.

Furthermore, in the battery protection circuit device 100 according to an example embodiment, when the charging voltage of the charger 300 exceeds 30 V, the first FET 130 may be turned off and the second FET 170 may be turned on. For example, when the charging voltage of the charger 300 exceeds 30 V, the magnitude of the voltage applied to the first voltage distribution resistor 111 is less than the magnitude of the threshold voltage of the first FET 130, and the magnitude of the voltage applied to the third voltage distribution resistor 151 is greater than the magnitude of the threshold voltage of the second FET 170.

Figure 4:
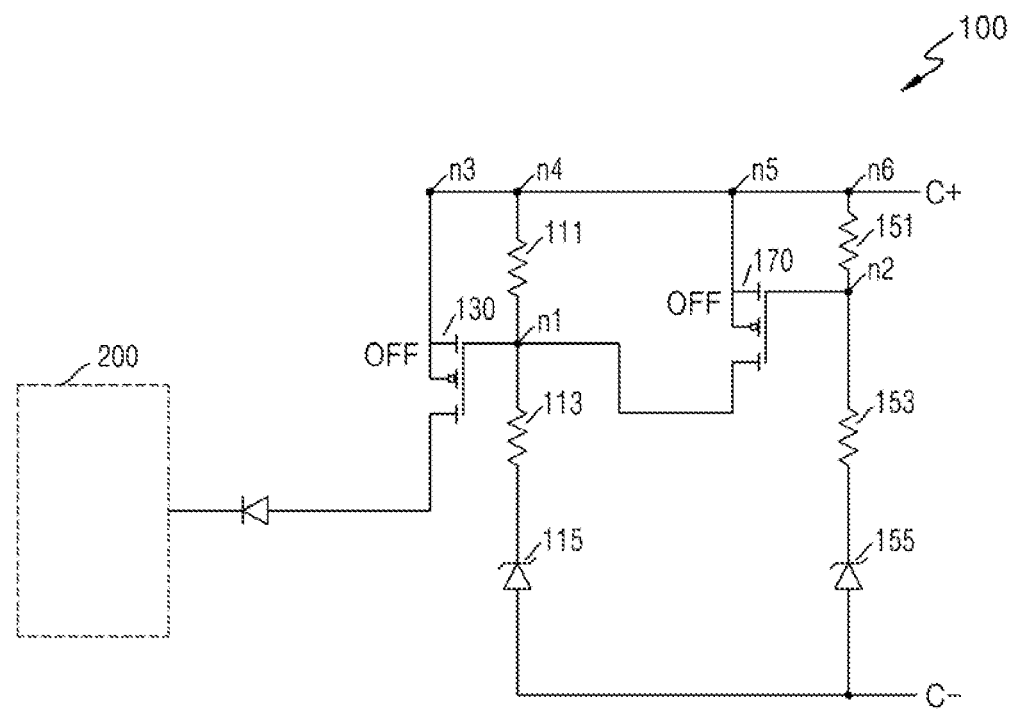
FIGS. 4, 5, and 6 are schematic circuit diagrams for explaining operations of a battery protection circuit device according to an example embodiment.
Figure 5:
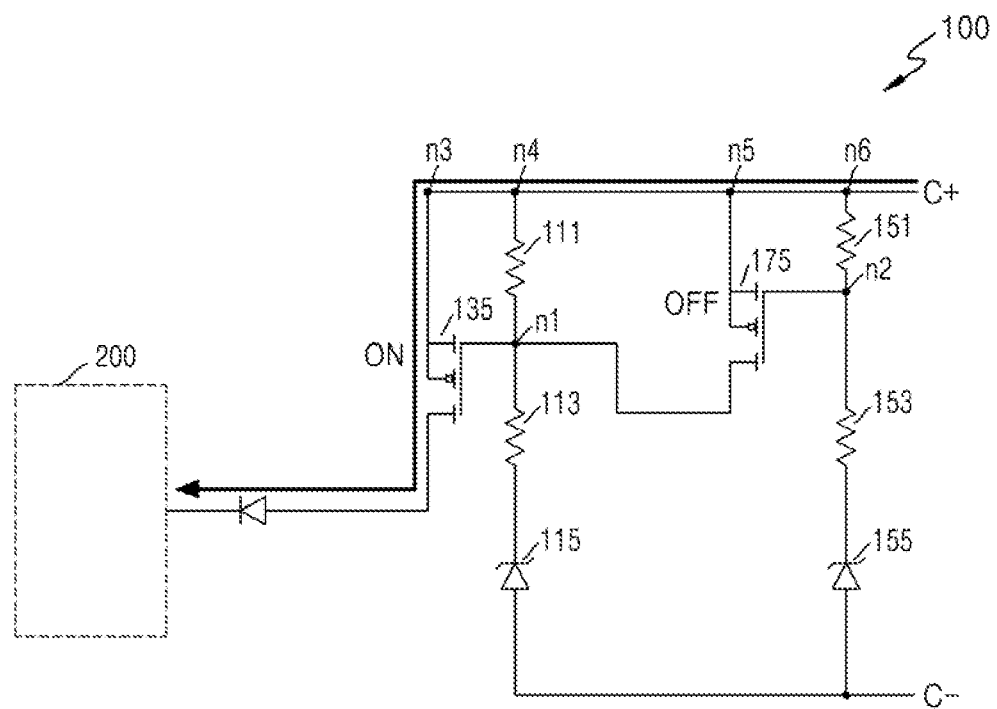
Figure 6:
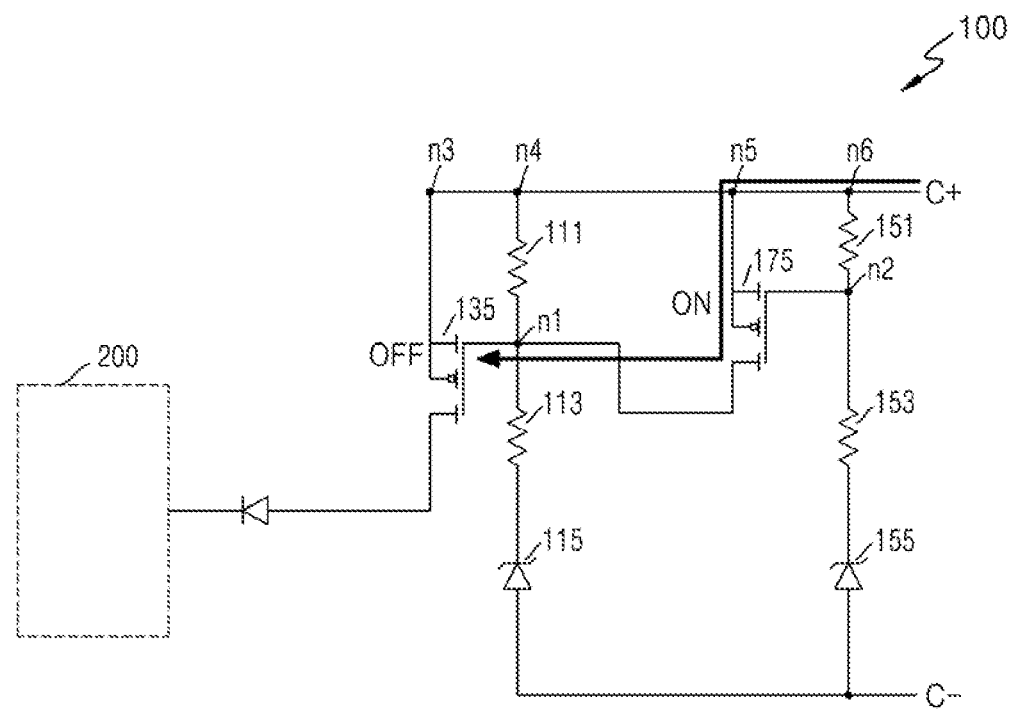

FIGS. 4, 5, and 6 are schematic circuit diagrams for explaining an operation of the battery protection circuit device 100 according to an example embodiment.

Referring to FIGS. 4 to 6, in the battery protection circuit device 100 according to an example embodiment, a preset charging voltage range may be set between 19 V and 30 V, by way of example.

FIG. 4 is a schematic circuit diagram for explaining an operation of the battery protection circuit device 100 when the charging voltage of the charger 300 is less than 19 V.

Referring to FIG. 4, the charging voltage of the charger 300 may be distributed and applied to each of the first voltage distribution resistor 111 and the third voltage distribution resistor 151. As the magnitude of the voltage applied to the first voltage distribution resistor 111 is less than the magnitude of the threshold voltage of the first FET 130, the first FET 130 may be turned off, and as the magnitude of the voltage applied to the third voltage distribution resistor 151 is less than the magnitude of the threshold voltage of the second FET 170, the second FET 170 may be turned off. In this case, the charging voltage of the charger 300 may not be applied to the battery 200. Furthermore, as the battery 200 does not recognize, e.g., receive, the charging voltage of the charger 300, a BMS of the battery 200 may not wake up.

FIG. 5 is a schematic circuit diagram for explaining an operation of the battery protection circuit device 100 when the charging voltage of the charger 300 is from 19 V to 30 V.

Referring to FIG. 5, the charging voltage of the charger 300 may be distributed and applied to each of the first voltage distribution resistor 111 and the third voltage distribution resistor 151. As the magnitude of the voltage applied to the first voltage distribution resistor 111 is greater than the magnitude of the threshold voltage of the first FET 130, the first FET 130 may be turned on, and as the magnitude of the voltage applied to the third voltage distribution resistor 151 is less than the magnitude of the threshold voltage of the second FET 170, the second FET 170 may be turned off. In this case, referring to FIG. 5, the charging voltage of the charger 300 may be applied to the battery 200.

FIG. 6 is a schematic circuit diagram for explaining an operation of the battery protection circuit device 100 when the charging voltage of the charger 300 exceeds 30 V.

Referring to FIG. 6, the charging voltage of the charger 300 may be distributed and applied to each of the first voltage distribution resistor 111 and the third voltage distribution resistor 151. As the magnitude of the voltage applied to the third voltage distribution resistor 151 is greater than the magnitude of the threshold voltage of the second FET 170, the second FET 170 may be turned on. In this case, referring to FIG. 6, the charging voltage of the charger 300 may be applied to the gate terminal of the first FET 130. Consequently, as the potential difference between the source terminal and gate terminal of the first FET 130 is 0, the magnitude of the voltage applied to the first voltage distribution resistor 111 is less than the magnitude of the threshold voltage of the first FET 130, and thus, the first FET 130 may be turned off. In this case, the charging voltage of the charger 300 may not be applied to the battery 200. Furthermore, as the battery 200 does not recognize, e.g., receive, the charging voltage of the charger 300, the BMS of the battery 200 may not wake up.

By way of summation and review, a lithium ion batteries may be damaged by overcharging. If a safety device against overcharging is not provided, the battery may explode or cause personal injury or property damage due to ignition. Software may be used to prevent charging by recognizing an undervoltage or overvoltage of a charger, when a low-voltage or over-voltage charger is connected to a battery. In this case, although a charging switch to connect between the battery and the charger is in a turned-off state, a microcontroller unit (MCU) of a battery management system (BMS) may be in a wake-up state, and thus, the battery may self-discharge until the voltage of the charger reaches a chargeable voltage range.

As described above, example embodiments may provide a battery protection circuit device that may effectively protect a battery during charging the battery.

According to an example embodiment, a charger is connected to the battery only when the charging voltage of the charger corresponds to a chargeable voltage range. This may protect the battery from an undervoltage and an overvoltage.

According to an example embodiment, the charging voltage of the charger may be recognized by hardware to correspond to a chargeable voltage range. This may prevent the battery from being self-discharged.

According to an example embodiment, a breakdown voltage applied to a first diode and a second diode may be adjusted or set. Thus, a chargeable voltage range of the charger may be effectively set.

As described above, inappropriate charging may be prevented using hardware so that a charger having a charging voltage that is not suitable for a chargeable voltage range may be prevented from being used or connected to a battery. Thus, a battery protection circuit device that may effectively protect a battery during charging the battery, may be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery protection circuit device, comprising:
 a first voltage distribution circuit having one end that electrically connects to a positive terminal of a charger, and having another end that electrically connects to a negative terminal of the charger, the first voltage distribution circuit being configured to distribute a charging voltage of the charger;
 a first FET that electrically connects between a battery and the positive terminal of the charger to receive a charging current from the charger and supply the charging current to the battery, the first FET being electrically connected to a first node of the first voltage distribution circuit, and turned on or off based on a magnitude of the charging voltage of the charger;
 a second voltage distribution circuit having one end that electrically connects to the positive terminal of the charger, and having another end that electrically connects to the negative terminal of the charger, the second voltage distribution circuit being configured to distribute the charging voltage of the charger; and
 a second FET that electrically connects to the positive terminal of the charger, the second FET being electrically connected to the first node of the first voltage distribution circuit and a second node of the second voltage distribution circuit, and turned on or off based on the magnitude of the charging voltage of the charger.

2. The battery protection circuit device as claimed in claim 1, wherein the first node is electrically connected to a gate terminal of the first FET, the battery electrically connects to a drain terminal of the first FET, and the positive terminal of the charger electrically connects to a source terminal of the first FET.

3. The battery protection circuit device as claimed in claim 1, wherein the second node is electrically connected to a gate terminal of the second FET, the first node is electrically connected to a drain terminal of the second FET, and the positive terminal of the charger electrically connects to a source terminal of the second FET.

4. The battery protection circuit device as claimed in claim 3, wherein, when a voltage having a second threshold value or greater is applied between the positive terminal of the charger and the second node, the second FET is turned on to apply the charging voltage of the charger to the first node.

5. The battery protection circuit device as claimed in claim 4, wherein, when the second FET is turned on and the charging voltage of the charger is applied to the first node, the first FET is turned off.

6. The battery protection circuit device as claimed in claim 4, wherein, when a voltage having a first threshold value or greater is applied between the positive terminal of the charger and the first node, the first FET is turned on to apply the charging voltage of the charger to the battery.

7. The battery protection circuit device as claimed in claim 6, wherein a magnitude of the first threshold value is less than a magnitude of the second threshold value.

8. The battery protection circuit device as claimed in claim 1, wherein the first voltage distribution circuit includes:
- a first voltage distribution resistor between the positive terminal of the charger and the first node, and
- a second voltage distribution resistor and a first diode between the first node and the negative terminal of the charger.

9. The battery protection circuit device as claimed in claim 8, wherein the second voltage distribution circuit includes:
- a third voltage distribution resistor between the positive terminal of the charger and the second node, and
- a fourth voltage distribution resistor and a second diode between the second node and the negative terminal of the charger.

10. The battery protection circuit device as claimed in claim 9, wherein each of the first diode and the second diode is a Zener diode connected in a reverse direction between the positive terminal and the negative terminal of the charger.

11. The battery protection circuit device as claimed in claim 10, wherein a magnitude of a voltage applied to the first diode is less than a magnitude of a voltage applied to the second diode.

12. A circuit, comprising:
- a first voltage distribution circuit having a first electrical connection to receive a positive voltage of a charger, and having a second electrical connection to receive a negative voltage of the charger;
- a second voltage distribution circuit having a first electrical connection to receive the positive voltage of the charger, and having a second electrical connection to receive the negative voltage of the charger;
- a first FET having a first electrical connection to receive the positive voltage of the charger, and having a second electrical connection to provide a voltage to a positive terminal of a battery; and
- a second FET having a first electrical connection to receive the positive voltage of the charger, and having a second electrical connection to a voltage distribution node of the first voltage distribution circuit, wherein:
- the first FET has a gate terminal that is electrically connected to the voltage distribution node of the first voltage distribution circuit, and
- the second FET has a gate terminal that is electrically connected to a voltage distribution node of the second voltage distribution circuit.

\* \* \* \* \*